United States Patent Office 2,776,648
Patented Jan. 8, 1957

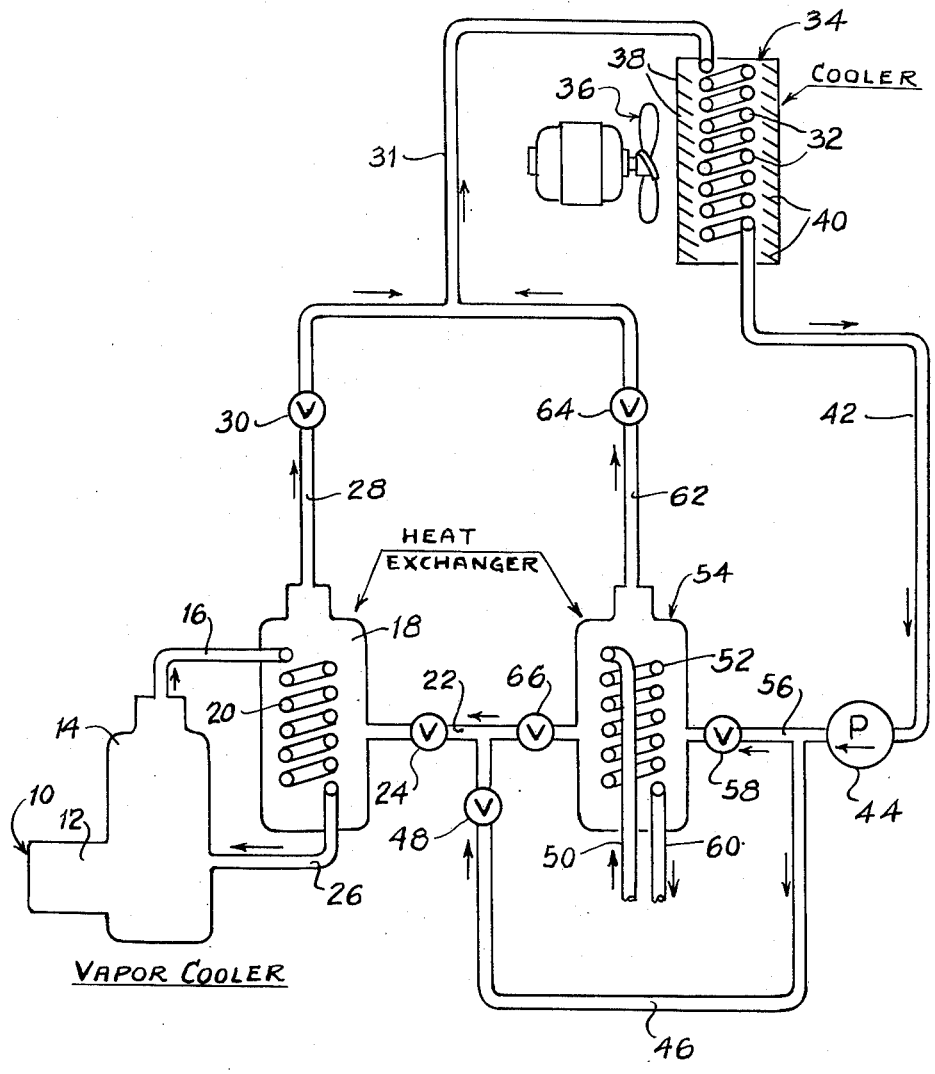

2,776,648

ENGINE COOLING PROCESS

James B. Taylor, Jr., Long Beach, Calif., assignor to Signal Oil and Gas Company, Los Angeles, Calif., a corporation of Delaware Application August 29, 1955, Serial No. 531,199

9 Claims. (Cl. 123—41.19)

This invention relates to the cooling of engines, particularly internal combustion engines. The invention is especially concerned with a novel process for cooling engines employing water as the engine coolant, and involving the utilization of a refrigerant for cooling the water circulating in the engine and air cooling of said refrigerant for re-use thereof in the foregoing manner.

In recent years there has been a trend towards the use of so-called "ebullition cooling" in connection with stationary engines of all sizes. In this process water is fed to the engine jackets and is allowed to boil at atmospheric pressure or above. The steam formed, along with any water that is carried by the steam, is condensed in a cooling unit, and the condensed water is either pumped or allowed to recirculate by gravity back to the engine. In other processes the water is circulated through the engine below the boiling temperature and the heated water from the engine is cooled to the proper temperature and recirculated to the engine.

In the above processes as well as other known processes for cooling water circulating in engines, and employing air as the means for cooling the circulating water, the difficulty arises that in any area where freezing weather exists, atmospheric air cooling presents the danger of freezing the engine circulating water in the process of cooling the same. Means must accordingly be provided to obtain temperature control of the cooling air so as to prevent such freezing from occurring.

It is known to cool water from an engine water jacket by bringing the water into heat exchange relation with a refrigerant such as ammonia, the refrigerant then being circulated through a compressor or absorber. However, none of these prior art processes employs atmospheric air in any manner for cooling purposes.

One object of this invention is the provision of a novel process for cooling the water circulating through an engine.

Another object is to provide novel procedure for cooling and recirculating water to an engine jacket using air as the ultimate cooling agent for the recirculated water, but employing said air indirectly and under conditions such that inordinately low air temperature, e. g., below freezing will not cause freezing of the water recirculated to the engine jacket.

Yet another object is to devise a novel process for cooling and recirculating hot water or steam exiting an engine jacket and recirculating the cooled or condensed water back to the engine for cooling same, employing air as the chief cooling agent but utilizing an intermediate cooling step whereby the hot water or steam to be cooled is not placed in direct heat exchange relation with the cooling air.

Still another object is to provide novel procedure in accordance with the foregoing objects and in conjunction with the cooling of the engine lubricating oil, also utilizing the cooling air as the ultimate coolant for the oil but carrying out the cooling of the oil under conditions whereby the oil is not placed in direct heat exchange relation with the air.

Yet another object is the provision of procedure for cooling engine circulating water inexpensively, essentially by atmospheric air utilizing simple and commercially available equipment.

These and other objects will appear from the following description of my invention taken in connection with the accompanying drawing schematically illustrating a system for carrying out my process.

I have found that by passing the heated water or steam from the cooling jacket of an engine such as an internal combustion engine, into heat exchange relation in a closed system with a refrigerant having a freezing point and a boiling point below that of water, e. g., dichloro-difluoromethane, known commercially as "Freon," and returning the exit water to the engine jacket for recirculation therein, I can cool the resulting refrigerant vapors in a closed system with atmospheric air even at temperatures below freezing, and then recirculate the condensed refrigerant again into heat exchange relation with the hot water or steam from the engine to cool the same. By means of the above intermediate refrigerant step, in effect, I employ atmospheric air as the ultimate or chief cooling agent. However, my procedure employing an intermediate cooling stage enables me to utilize air cooling in areas where freezing weather conditions exist, where otherwise such air cooling would be impractical because of the danger of freezing of the engine cooling water. By bringing the cooling air into heat exchange contact with a non-freezing refrigerant material such as "Freon" instead of in direct heat exchange relation with the hot water or steam from the engine to be cooled, there is no danger of freezing of the engine cooling fluid.

The invention process can also be simultaneously employed for cooling of the engine lubricating oil by passing the refrigerant into heat exchange contact with the lubricating oil circulated in a closed system from the engine, returning the cooled oil to the engine, recycling a heated portion of the refrigerant back to the air cooler, and passing the remaining exiting refrigerant on to the heat exchanger for cooling the hot water or steam from the engine in the aforesaid manner, followed by recirculation of the exiting refrigerant to the air cooling stage.

The heat transfer rate of lubricating oil to either water in a closed container or to air in an aerial cooler is relatively low. By passing the oil through an exchanger in heat transfer relation to "Freon" or other suitable refrigerant, the heat transfer rate is considerably enhanced, and hence a smaller heat exchange unit can be used. This type of operation is easy to control and avoids the difficulties of cold winter operation, either in connection with a cooling tower or through the use of air as a direct cooling medium for the oil. In this case, the difficulty is not the freezing of the oil but in developing such high viscosities within a cooling unit as to present pumping difficulties.

The invention thus affords a unitary and efficient process wherein the engine jacket water and the engine lubricating oil are properly cooled using a refrigerant for direct transfer of heat from the jacket water or steam, and also from the lubricating oil, to the refrigerant, followed by withdrawal of heat from the refrigerant by cooling thereof with atmospheric air. The heat transfer from the oil causes vaporization of sufficient refrigerant so that the amount of refrigerant remaining and subsequently passed into heat exchange relation with the engine jacket water or steam, is sufficient to provide the proper cooling or condensation thereof without unduly lowering the temperature of the jacket water.

Referring to the drawing, numeral 10 schematically represents an engine having a water cooling jacket 12 through which water is circulated. The engine may be any type of engine employing water cooling such as an internal combustion, e. g., gas, engine. The water can be circulated through the engine jacket at a temperature below boiling, and the exiting mixture of hot water and water vapor cooled according to the instant improvements, or the water can be circulated through the jacket and allowed to boil therein at atmospheric pressure or above, so that the exiting fluid to be cooled is essentially in the form of steam. The latter ebullition type operation is particularly suited to the process of the invention, and will be used to illustrate the process, although it is to be understood that the process has wider application and can be employed where the exiting liquid from the engine jacket is essentially hot water rather than steam.

The steam leaving the cooling jacket of the engine 10 passes into a vapor collector or cooler 14, and then circulates through line 16 and into the heat exchanger 18, wherein the steam passes through coils 20 in heat exchange relation with a refrigerant of the type previously mentioned. The refrigerant should be one having a freezing point substantially lower than the freezing point of water, and a boiling point substantially lower than the boiling point of water, the refrigerant also having a low vapor pressure. Suitable refrigerants are, for example, "Freon," alcohol, propane, butane, ammonia, and sulfur dioxide. All of these materials have a freezing point below the freezing point of water and below the lowest temperature of the air which is to be used for cooling, and a boiling point sufficiently high to be condensed by such air at the pressures employed. Assuming the use of "Freon," a preferred refrigerant, in further describing my process, the "Freon" is introduced through line 22 and valve 24 into the heat exchanger 18 and into contact with the outer surface of coils 20 carrying the steam from the engine.

Heat is thus withdrawn from the steam causing it to condense in the coils 20 and to circulate back essentially in the form of water through line 26 to the vapor cooler 14, wherein the steam exiting the cooling jacket of the engine is initially cooled by said recirculated water prior to passage of the steam into line 16 as aforesaid. The latent heat of the steam during condensation thereof is transferred to the liquid "Freon" in exchanger 18 to cause vaporization thereof. The "Freon" gas then passes through line 28, valve 30 therein, and line 31 to the coils 32 of a cooling chamber 34. Atmospheric air is circulated by a blower or fan 36 through louvers 38 and 40 into and out of the cooling chamber 34 in contact with the coils 32, cooling the "Freon" refrigerant carried therein sufficiently to cause condensation of the "Freon." The "Freon" condensate is then recycled via line 42, pump 44, line 46, valve 48, line 22 and valve 24 to the heat exchanger 18 for condensation of additional steam passing through coils 20.

If desired, the lubricating oil from engine 10 can also be simultaneously cooled by conducting it from the engine through a line 50 into the coils 52 contained in a heat exchanger 54. "Freon" refrigerant in liquid form is conducted via pump 44, line 56 and valve 58 into the heat exchanger 54 and into contact with the coils 52 carrying the hot oil. Heat is thus transferred from the hot oil to the "Freon," thus cooling the oil which is recirculated via line 60 back to the lubricating system of engine 10. A portion of the liquid "Freon" in exchanger 54 is evaporated by receipt of sensible heat from the oil, and the resulting "Freon" vapors rise through line 62, and valve 64, and are conducted via line 31 to the cooling chamber 34 wherein the "Freon" vapors are condensed in the manner previously described. The remaining "Freon" condensate in exchanger 54 which is not vaporized by the hot oil passing through coils 52 of heat exchanger 54 passes via valve 66, line 22, and valve 24 into the heat exchanger 18 for condensing the steam passing through coils 20 as above described. The pressure in exchanger 54 is maintained above that in exchanger 18 by suitable adjustment of valves 30, 64, and 66. When operating in the above manner to cool the engine lubricating oil as well as to condense the steam from the engine jacket, by-pass line 46 can be closed by closing valve 48.

The proportion of liquid "Freon" passing from heat exchanger 54 into heat exchanger 18 is generally substantially greater than the proportion of liquid "Freon" which is vaporized in exchanger 54 and passed through lines 62 and 31 into the cooler 54. Hence, the major proportion of "Freon" refrigerant circulating through the system is available for condensing the steam from the engine jacket in exchanger 18. It will also be observed that the conjoint operation of heat exchanger 54 for cooling the engine lubricating oil along with heat exchanger 18 for condensing the steam from the engine jacket, particularly utilizing series flow of refrigerant from heat exchanger 54 to heat exchanger 18, permits the bleeding off of a portion of the refrigerant through line 62 as result of cooling of the oil in exchanger 54, thus reducing the amount of refrigerant passing into exchanger 18. This results in a closer and more efficient control of the operation of exchanger 18, and facilitates regulation thereof so that essentially the same amount of "Freon" in exchanger 18 which is evaporated during a given period is recycled as liquid to the exchanger via line 22, thus maintaining a balanced amount of "Freon" in exchanger 18. This prevents accumulation of an excess of liquid "Freon" in exchanger 18.

It will be observed that according to my invention, the refrigerant operates in a closed system under the autogenous pressure developed therein at the temperatures encountered in the system. Hence, the cooling air temperatures at cooler 34 can vary considerably from temperatures below the normal freezing point of water to temperatures above said freezing point, and still function to cool the refrigerant, e. g., "freon," sufficiently to condense the vapors thereof passing through coils 32 of the cooler, which condensate is then circulated to exchangers 18 and 54. Hence, my system avoids the need for compression of the refrigerant vapors in order to condense such vapors.

In addition to the over-all economies in operation realized by my process, it is seen that the most important feature of the invention resides in permitting aerial cooling or condensation of the engine jacket water or steam at sub-freezing temperatures without any operating hazard of possible freezing of the engine jacket water which could otherwise occur. This is accomplished by a relatively simple procedure according to the invention and involving an intermediate refrigerant cooling step so that the engine jacket water or steam does not come into direct heat exchange relation with the cooling air, but rather with the refrigerant, the latter then being cooled by the air. The equipment employed is of standard design and is relatively inexpensive to operate.

While I have described a particular embodiment of my invention for the purpose of illustration, it should be understood that various modifications and adaptations thereof may be made within the spirit of the invention as set forth in the appended claims.

I claim:

1. A process for cooling an engine which comprises circulating water through an engine, passing the resulting heated fluid in heat exchange relation with a liquid refrigerant having a freezing point below the freezing point of water and a boiling point below the boiling point of water, transferring heat from said fluid to said refrigerant, returning the exit water formed from said fluid to said engine, and circulating the heated refrigerant through an air cooled condenser.

2. A process for cooling an engine which comprises circulating cooling water through an engine to form steam, passing said steam in heat exchange relation with a liquid refrigerant having a freezing point below the freezing point of water and a boiling point below the boiling point of water, and a low vapor pressure, transferring heat from said steam to said refrigerant to cause evaporation of said refrigerant and condensation of said steam to water, returning the condensed water to said engine, and circulating the resulting refrigerant vapors through an air cooled condenser.

3. A process for cooling an engine which comprises circulating water through an engine jacket and converting said water to steam in said jacket, passing said steam in a closed cycle into heat exchange relation with a liquid refrigerant having a freezing point substantially below the freezing point of water and a boiling point substantially below the boiling point of water, and having a low vapor pressure, condensing said steam to form water and evaporating said refrigerant, returning said last-mentioned water to said engine jacket for circulation therein, circulating the resulting refrigerant vapors in a closed cycle in heat exchange relation to cool air, and condensing said vapors.

4. A process for cooling an engine which comprises circulating water through an engine, passing the resulting heated fluid in heat exchange relation with a liquid refrigerant having a freezing point below the freezing point of water and a boiling point below the boiling point of water, transferring heat from said fluid to said refrigerant to cause evaporation of said refrigerant and produce a water condensate from said fluid, returning the exit water to said engine, and circulating cold air at a temperature below the normal freezing point of water in heat exchange relation with the exit refrigerant vapors, the freezing point of said refrigerant being below the temperature of said air.

5. A process for cooling an engine which comprises circulating water through an engine jacket and converting said water to steam in said jacket, passing said steam in a closed cycle into heat exchange relation with a liquid refrigerant having a freezing point substantially below the freezing point of water and a boiling point substantially below the boiling point of water, and having a low vapor pressure, condensing said steam to form water and evaporating said refrigerant, returning said water to said engine jacket for circulation therein, circulating cold air at a temperature below the normal freezing point of water in heat exchange relation with the exiting refrigerant vapors, condensing said vapors, and passing the resulting refrigerant condensate into heat exchange relation with said steam as aforesaid, the freezing point of said refrigerant being below the temperature of said air.

6. A process for cooling an engine which comprises circulating water through an engine, passing the resulting heated fluid in heat exchange relation with a refrigerant having a freezing point and boiling point below a freezing point below the freezing point of water and a boiling point below the boiling point of water, transferring heat from said fluid to said refrigerant, returning the exit water formed from said fluid to said engine, circulating the exit refrigerant through an air cooled condenser, passing the exiting refrigerant into heat exchange relation with lubricating oil from said engine, returning said oil to said engine, circulating a portion of the exit refrigerant through said air cooled condenser, and passing the remainder of said exit refrigerant in heat exchange relation with said fluid as aforesaid.

7. A process for cooling an engine which comprises circulating water through an engine jacket and converting said water to steam in said jacket, passing said steam in a closed cycle into heat exchange relation with a liquid refrigerant having a freezing point substantially below the freezing point of water and a boiling point substantially below the boiling point of water, and having a low vapor pressure, condensing said steam to form water and evaporating said refrigerant, returning said last mentioned water to said engine jacket for circulation therein, circulating the resulting refrigerant vapors in a closed cycle in heat exchange relation to cool air, condensing said vapors, passing the thus formed refrigerant condensate into heat exchange relation with lubricating oil from said engine to cause evaporation of a portion of said refrigerant condensate and to cool said oil, returning said oil to said engine, circulating said last mentioned refrigerant vapors in heat exchange relation to said cool air, and passing the remainder of said refrigerant condensate in heat exchange relation with said steam as aforesaid.

8. A process as defined in claim 7, wherein said cool air is at a temperature below the normal freezing point of water, and the freezing point of said refrigerant is below the temperature of said air.

9. A process as defined in claim 1, wherein said refrigerant is dichlorodifluoromethane.

References Cited in the file of this patent

UNITED STATES PATENTS

| | | |
|---|---|---|
| 2,237,910 | Nallinger | Apr. 8, 1941 |
| 2,298,214 | Jones | Oct. 6, 1942 |